United States Patent [19]

Mahoney

[11] 4,333,422
[45] Jun. 8, 1982

[54] HOT FUEL GAS GENERATOR WITH DUAL CONTROLS

[76] Inventor: Fred G. Mahoney, 509 Dorseyville Rd., Pittsburgh, Pa. 15238

[21] Appl. No.: 181,878

[22] Filed: Aug. 27, 1980

[51] Int. Cl.³ .............................................. F02B 43/00
[52] U.S. Cl. .................................... 123/3; 123/25 B; 123/25 E; 123/25 L; 123/557
[58] Field of Search ............ 123/3, 25 R, 25 B, 25 C, 123/25 E, 25 P, 25 L, 557, 558

[56] References Cited

U.S. PATENT DOCUMENTS

| | | | |
|---|---|---|---|
| 2,080,420 | 5/1937 | Havekost et al. | 123/25 B |
| 2,444,628 | 7/1948 | Briggs et al. | 123/25 B |
| 2,444,670 | 7/1948 | Porter | 123/25 B |
| 2,560,197 | 7/1951 | Spillane | 123/25 B |
| 2,686,502 | 8/1954 | Tesch | 123/25 B |
| 4,023,538 | 5/1977 | Harpman et al. | 123/25 P |
| 4,030,453 | 6/1977 | Sugimoto | 123/25 B |
| 4,112,889 | 9/1978 | Harpman | 123/25 P |
| 4,114,566 | 9/1978 | Harpman et al. | 123/3 |
| 4,197,819 | 4/1980 | Mahoney et al. | 123/558 |

Primary Examiner—Ira S. Lazarus
Attorney, Agent, or Firm—William S. Britt

[57] ABSTRACT

A hot fuel gas generator for an internal combustion engine simultaneously vaporizes gasoline and water in a novel heat exchanger mounted in an exhaust manifold of an internal combustion engine. A control valve meters the amount of a water and gasoline mixture supplied to the heat exchanger which delivers the resulting superheated steam and gaseous fuel to the intake manifold by way of an adapter downstream of the location of the usual carburetor. The control valve is actuated by devices responsive in operation to inlet manifold pressure of the internal combustion engine.

6 Claims, 6 Drawing Figures

HOT FUEL GAS GENERATOR WITH DUAL CONTROLS

BACKGROUND OF THE INVENTION

1. Field of the Invention

This invention relates to fuel systems and vaporizing devices therein for internal combustion engines and more particularly to fuel gas generators and controls therefor.

2. Description of the Prior Art

Fuel systems for internal combustion engines have generally used carburetors in which gasoline is sprayed into a stream of air and divided into a series of fine droplets approaching vaporization and conveyed to the point of combustion. Several attempts to improve vaporization may be seen in U.S. Pat. Nos. 1,110,482, 2,585,171, 2,285,905 and 2,272,341.

Prior art devices for generating and controlling hot fuel gases are seen in U.S. Pat. Nos. 3,968,775, 4,112,889, 4,023,538, 4,050,419, 4,114,566, 4,145,998 and 4,197,819.

The present invention discloses a new form of heat exchanger in which an increased tortuous passageway for the liquid hydrycarbon and water being converted into the hot fuel gas is disclosed along with an improved control means which is responsive to inlet manifold pressure which results in the efficient generation of a satisfactory hot fuel gas for an internal combustion engine and the practical control thereof which has heretofore been difficult in prior art devices.

The present invention simultaneously vaporizes the liquid fuel and water at a high temperature in a heat exchanger in the exhaust manifold of the engine so that the fuel mixture in its heated gaseous state achieves practically complete combustion in the internal combustion engine due to the spacing of the hydrocarbon molecules resulting from the heat and the presence of the superheated steam in the hot fuel gas.

SUMMARY OF THE INVENTION

A hot fuel gas generator having a novel heat exchanger positioned in an exhaust manifold of an internal combustion engine is disclosed in which gasoline and water are simultaneously vaporized to produce a hot gaseous fuel. The gasoline and water are supplied to the heat exchanger through a control valve, the heat exchanger is in communication with the inlet manifold of the engine by way of a secondary control valve, both valves being responsive in operation to inlet manifold pressure of the engine as predetermined so that the delivery of the liquid fuel and water to the heat exchanger and the hot fuel gas to the intake manifold is advantageously controlled. The partial vacuum resulting from the operation of the internal combustion engine mixes combustion air with the hot gaseous fuel from the generator and moves the same through the inlet manifold to the areas of combustion in the engine. The complete vaporization of the liquid fuel and water is caused by high temperature heat in the exhaust manifold of the engine. Gasoline or other hydrocarbon fuel in the ratio of 80% to 20% water makes a highly satisfactory hot gaseous fuel. Alternately 70% gasoline, 15% water and 15% alcohol is also satisfactory.

A 1978 Chevrolet Sedan having a 305 cubic inch engine equipped with the invention as disclosed herein shows practically no pollutants in its exhaust as determined by tests in an EPA certified laboratory and regularly delivers 50 miles to a gallon of gasoline in tests on an EPA approved laboratory test track, the EPA city rating for this vehicle being 16 miles per gallon and the highway rating being 18 miles per gallon.

DESCRIPTION OF THE PREFERRED EMBODIMENT

Figure 1:
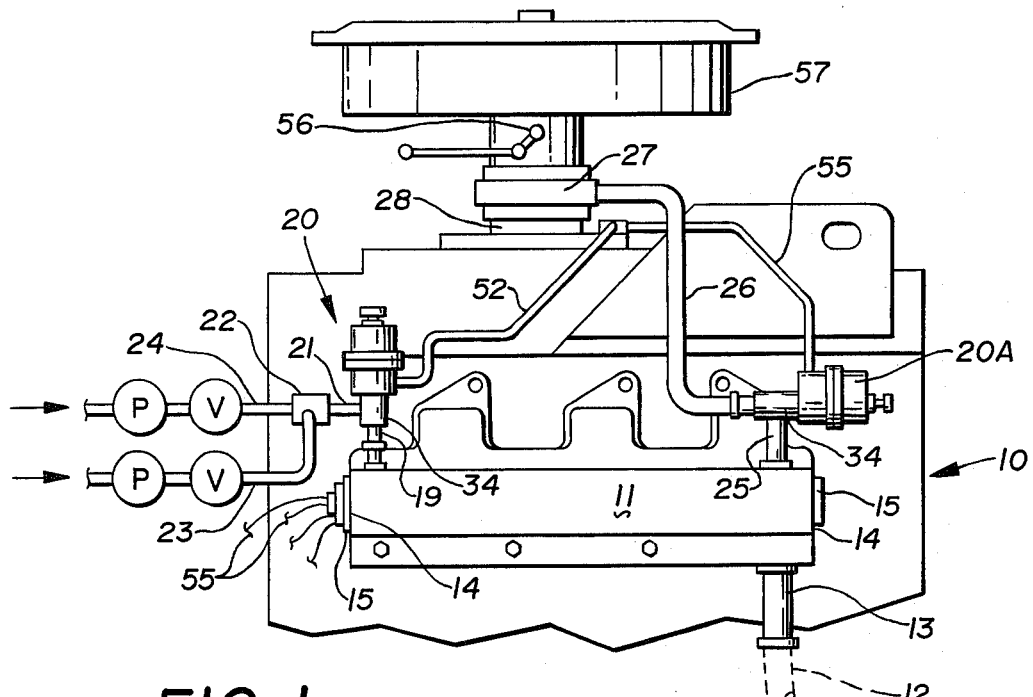
FIG. 1 is a side view with parts broken away illustrating a portion of an internal combustion engine and exhaust manifold and the present invention installed thereon.
Figure 3:
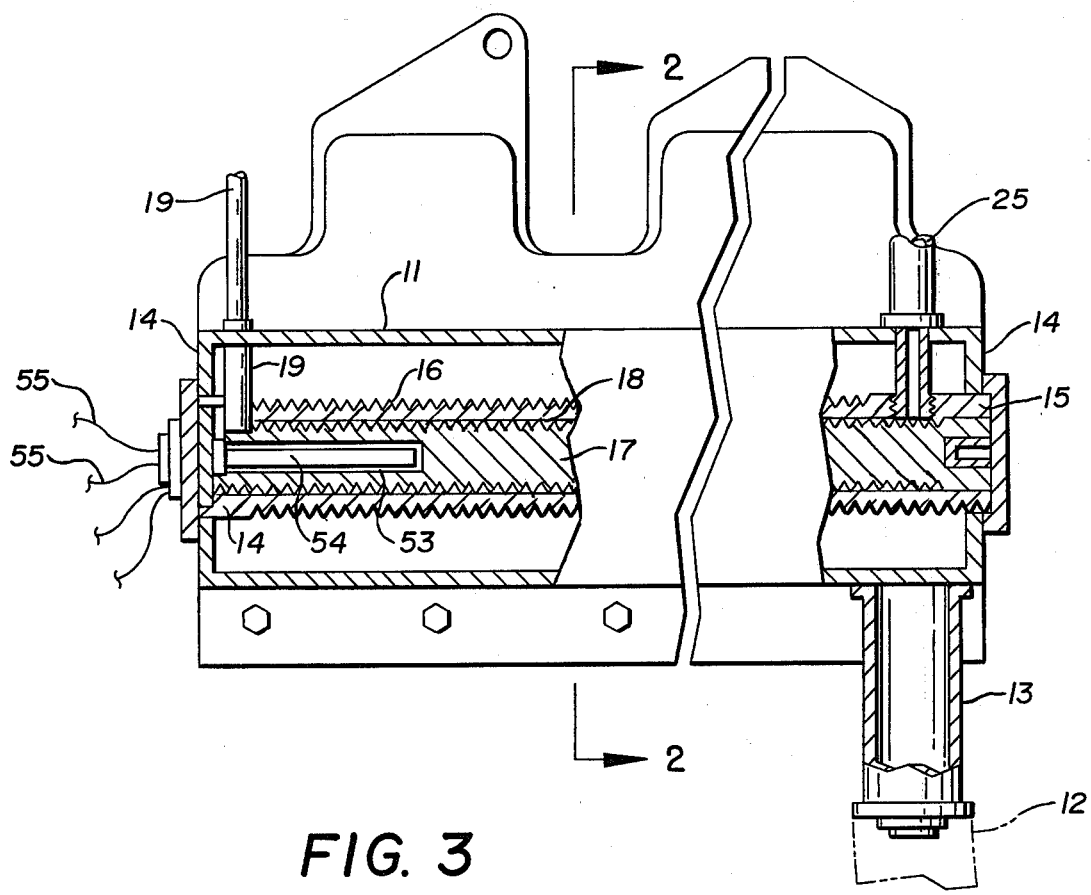
FIG. 3 is a side elevation of the exhaust manifold with parts broken away and parts in cross section.

By referring to the drawings and FIGS. 1 and 3 in particular, it will be seen that a diagrammatic representation of an internal combustion engine is indicated by the numeral 10 with an exhaust manifold thereon indicated by the numeral 11. The exhaust manifold 11 communicates with a tail pipe or exhaust pipe 12 by way of a tubular extension 13. The opposite ends 14 of the exhaust manifold 11 are provided with openings through which the capped ends of a tube 15 of a tubular heat exchanger extend.

Figure 4:
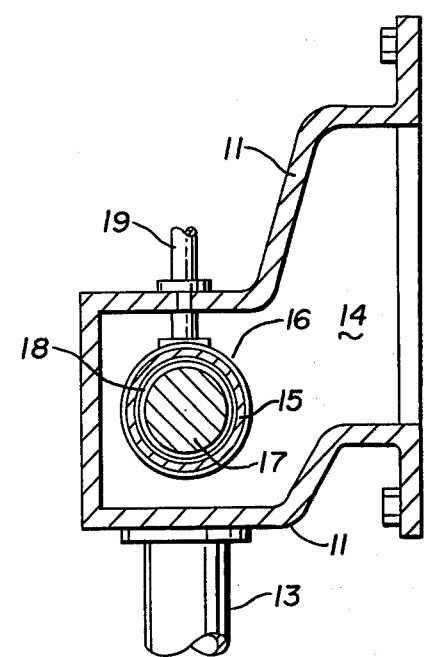
FIG. 4 is a vertical section on lines 4—4 of FIG. 3 through the exhaust manifold showing the heat exchanger of the invention.

As seen in FIGS. 3 and 4 of the drawings, the tubular heat exchanger comprises the tube 15 which has a spiral screw threaded pattern 16 in its outer surface. An elongated body member 17 having a spiral screw thread pattern 18 formed continuously on its outer surface is positioned in the tube 15 in contact therewith so that a spiral passageway is formed by the continuous thread pattern 18. At the left end of the illustration in FIG. 3 of the drawings, a tube 19 will be seen to communicate with the interior of the tube 15 adjacent one end of the metal body member 17 and with the spiral passageway formed by the thread pattern 18. The tube 19 extends upwardly and through the top of the exhaust manifold 11 and communicates with a control valve 20 as seen in FIGS. 1 and 2 of the drawings, into which a liquid hydrocarbon and water are delivered by a supply pipe 21 from a tangential mixing chamber 22 having a water inlet pipe 23 and a hydrocarbon inlet pipe 24 connected thereto.

Figure 2:
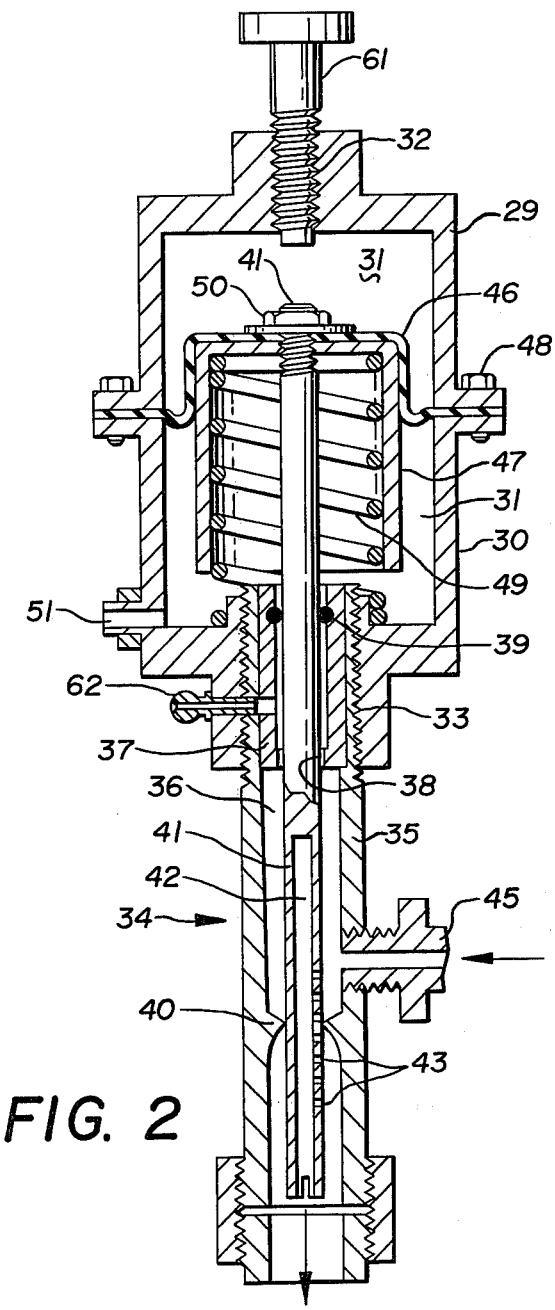
FIG. 2 is a cross sectional side elevation of one of the control valves of the invention.

Referring now to FIGS. 3 and 4 of the drawings, it will be seen that the other or right end of the tube 15 has an opening therein inwardly of the end thereof, which opening communicates with an insulated tubular member 25 which extends upwardly and out of the exhaust manifold 11 and communicates with one end of a duplicate secondary control valve mechanism 20A as seen in FIGS. 1 and 2 of the drawings. A pipe 26 communicates with a control valve 20A and an adaptor 27 positioned on the internal combustion engine 10 in direct communication with an inlet manifold 28.

Referring now to FIGS. 1 and 2 of the drawings, the control valves 20 and 20A, which are identical, are comprised of a pair of hollow body members 29 and 30 which define a diaphragm chamber 31 having a pair of threaded axial passageways 32 and 33 in the opposite ends thereof. A valve body 34 is comprised of a tubular body member 35, one end of which is engaged in the threaded opening 33 in the body member 30. The tubular body member 35 has an area of increased interior diameter 36 and a reduction fitting 37 having an opening 38 in one end and an O-ring 39 in the other end is positioned therein.

An area of reduced interior diameter 40 within the body member 35 provides a metal to metal seal around a rod 41 positioned axially of the body member 35, the reduction fitting 37 and extending into the diaphragm chamber 31. The rod 41 has a passageway 42 extending from one end inwardly approximately one-half of its overall length. A row of longitudinally spaced apertures 43 are formed in the rod 41 in the area of the reduced interior diameter 40 so as to communicate with the passageway 42 therein and a valve chamber 44 defined between the end of the reduction fitting 37 and the area of reduced interior diameter 40.

An opening in the body member 35 communicates with the valve chamber 44 and a tubular fitting 45. In the valve 20 which is on the inlet side of the heat exchanger, the tubular fitting 45 is connected to the pipe 21 and on the outlet side of the heat exchanger the control valve 20A is connected to the tubular fitting 45 by the insulated tubular member 25.

The valves 20 and 20A are identical and respectively control the liquid entering the heat exchanger and the hot gaseous fuel which is produced thereby and flows therefrom.

Referring again to FIG. 2 of the drawings, it will be seen that the rod 41 extends out of the body member 35 into the diaphragm chamber 31 where it is attached to a diaphragm 46 and a cup-shaped member 47. The diaphragm 46 is secured between annular flanges on the body members 29 and 30 which are secured to one another by fasteners 48. A spring 49 is positioned in the cup-shaped member 47 and the body member 30. The cup-shaped member 47 is adjustably positioned on the rod 41 by a nut 50 so that a desired idling rate can be achieved.

An opening 51 in the body member 30 communicates with a pipe 52 which leads to the inlet manifold 28 as best seen in FIG. 1 of the drawings.

Thus inlet manifold pressure which is usually subatmospheric or negative pressure is present in the diaphragm chamber 31 making the diaphragm 46 and in turn the rod 41 responsive to the changes in manifold negative pressure as regulated by the resistance of the spring 49 thereupon.

In FIG. 3 of the drawings, an axially extending opening 53 will be seen to be formed in one end of the metal body member 17 and an electrical resistant heating element 54 is positioned therein and connected to electrical conductors 55 exteriorly of the exhaust manifold 11. Under some conditions it may be desirable to utilize the resistant heating element 54 to bring the metal body member 17 to a sufficient temperature such as 300° F. to insure vaporization of the water and liquid hydrocarbon being supplied thereto as heretofore explained.

Referring now to FIG. 1 of the drawings, it will be seen that the tangential premixing chamber 22 is provided to insure a swirling mix of the liquid hydrocarbon and water supplied thereto and it will be understood that the water may comprise an alcohol mixture as necessary to prevent freezing of the water supply as may otherwise occur in a cold climate.

The liquid hydrocarbon, such as gasoline, and kerosene operates equally efficiently as does furnace oil and the like, is delivered through the pipe 24 by way of a valve V and the usual pump P on the vehicle at a suitable working pressure and the water and/or water and alcohol mixture is similarly controlled and supplied through the pipe 23. The supply pressures need only be sufficient to overcome any tendency of the hot gas being generated to flow backward toward the supply source and in such event check valves can be inserted in the supply pipes 23 and 24. In experimental models no back pressure or flow has been observed as the outlet ports and the tubular members leading from the heat exchanger are of larger capacity than the ports supplying the liquid hydrocarbon and water or water and alcohol mixture as aforesaid.

Figure 5:
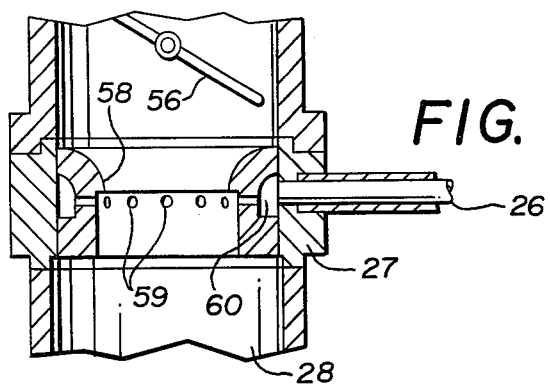
FIG. 5 is a cross sectional view of an inlet manifold adaptor used with the invention.

In FIGS. 1 and 5 of the drawings, the adaptor 27 may be seen positioned on the tubular inlet of the inlet manifold 28 and in communication below a butterfly valve 56 having an air cleaner 57 positioned thereon. The adaptor 27 will be seen to include a restrictive throat in the form of a Venturi 58 with a plurality of openings 59 therebelow which communicate with an annular passageway 60 which in turn is in communication with the insulated tubular member 26 heretofore described by which the hot fuel gas is delivered from the heat exchanger to the inlet manifold 28.

In operation as the engine 10 increases the negative inlet manifold pressure, the diaphragm 46 is moved in an action which compresses the spring 49. Such movement moves the rod 41 so as to increase the restriction on the flow of the fuel through the control valves 20 and 20A and thereby regulate the flow of hot fuel gas from the heat exchanger to the engine 10 in the valve 20A and the fuel and water to the heat exchanger in the valve 20.

Conversely, when the negative pressure in the inlet manifold lessens as by the opening of the butterfly valve 56 as during acceleration thereby controlling the combustion air to the adaptor 27, the spring 49 moves the diaphragm 46 in the opposite direction and thus the rod 41 moves increasing the number of apertures 43 exposed to the fuel supply and correspondingly the amount of fuel passing to the engine 10.

Those skilled in the art will observe that when the accelerator pedal in the vehicle is depressed so as to speed up the engine and the vehicle, the resultant action is the opening of the butterfly valve 56 as hereinbefore described and the admission of the additional combustion air and it will be seen that in direct proportion to the increase of admission of such combustion air, the smaller negative pressure in the inlet manifold causes an increase in the hot fuel gas supplied to the engine through the valve 20A and the amount of fuel and water supplied to the heat exchanger through the valve 20. When the accelerator is released and the butterfly valve 56 closes or goes to nearly closed position as is necessary to sustain an idling engine, the negative manifold pressure increases to a greater negative pressure.

Those skilled in the art will observe that the inlet manifold negative pressures are usually measured in terms of inches of mercury in a device adapted to calibrate such pressure changes and that a greater negative pressure could be expressed in terms of from 10 to 13 inches of mercury while a lesser negative pressure would be expressed in terms of 1 to 3 or 4 inches with the intermediate inches of mercury indicating the direction in which the negative pressure was increasing or decreasing responsive to the suction-like action created by the pistons in the internal combustion engine and the position of a butterfly valve in the carburetor or its replacement which controls the admission of combustion air.

Referring to FIG. 2 of the drawings, it will be observed that the control valve 20A has an adjustement screw 61 which can be rotated so as to limit the distance of travel of the rod 41 and the diaphragm 46 depending on the size of the engine that the device is installed on. To establish a desired idle rate, the nut 50 is adjusted to position the cup-shaped member 47 on the rod 41 exposing several of the apertures 43 therein at all times. The hot fuel gas generator with dual control valves disclosed herein may be readily installed on existing automobiles and trucks having gasoline fueled internal combustion engines by the simple replacement of an exhaust manifold, the introduction of the adaptor fitting in the inlet of the inlet manifold where it replaces the usual carburetor or may be used in conjuction therewith. One or more fuel pumps or the like is provided to deliver both the hydrocarbon fuel and water at a working pressure of approximately 2 lbs. The connection of the electrical resistant heating element in the heat exchanger to the electrical system of the vehicle and the connection of the inlet manifold pressure responsive actuators to the inlet manifold complete the installation of the device.

When installed the desired amounts of water and/or water alcohol mix which may be supplied from a container for example positioned adjacent the engine is delivered to the tangential mixing chamber 22 along with the hydrocarbon fuel such as gasoline. The gasoline, water or water alcohol mix are then delivered directly to the control valve 20 and then to the heat exchanger where they follow the spiral path formed around the metallic body member 17 by the screw-like configuration 18 and in a typical example create a path having a total inches of approximately 440.

Insomuch as gasoline vaporizes at a relatively low temperature such as 150° F. and the fact that the heat exchanger reaches a temperature of 300° F. in less than a minute after the operation of the engine begins, it will be apparent that the hot fuel gas will be generated in the heat exchanger and delivered by the tubular member 26 to the control valve 28 and from the same directly to the inlet manifold of the vehicle. A test of the exhaust emissions at an EPA certified laboratory in a test vehicle equipped with the invention showed the exhaust containing HC mass at 0.36. The CO Mass at 0.83 and the NOx at 1.41 representing a very substantial improvement in the emissions by the lowering of the pollutants well below the heretofore obtainable levels and demonstrating the efficiency of the hot fuel gas generator and the fuel supplied to the engine thereby.

It is necessary to maintain a seal between the rod 41 and the reduction fitting 37 and in order to do so the area in the reduction fitting 37 is filled with a flurosilicon lubricant through a fitting 62 in the wall of the body member 30 as seen in FIG. 2 of the drawings.

Figure 6:
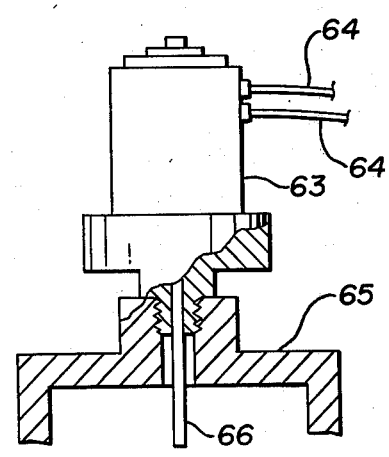
FIG. 6 is a cross sectional side elevation of a portion broken away from FIG. 2 showing an alternate form of the device.

Referring now to FIGS. 2 and 6 of the drawings, an alternate adjustment control is shown wherein the adjustment screw 61 in FIG. 2 of the drawings has been replaced by a solenoid 63 threadably positioned in a body member 65 and having a plunger 66 and electric conductors 64. In the operation of the alternate adjustment control, the plunger 66 limits the distance of travel of the rod 41 and additionally when the solenoid 63 is activated overrides the spring on the rod 41 and forces the same to a fixed idle position as hereinbefore described.

Although but one embodiment of the present invention has been illustrated and described, it will be apparent to those skilled in the art that various changes and modifications may be made therein without departing from the spirit of the invention or from the scope of the applied claims, and having thus described my invention what I claim is:

1. A generator for producing hot fuel gas for an internal combustion engine having intake and exhaust manifolds, said generator comprising a heat exchanger positioned through said exhaust manifold, the heat exchanger comprising a tubular member having inner and outer surfaces, means closing the ends of said tubular member, an elongated body member positioned in said tubular member in continuous engagement with said inner surface thereof, the exterior of said body member having a continuous spiral configuration therein forming an elongated continuous spiral passageway, means for introducing liquids to be gasified into one end of said spiral passageway and means communicating with the other end thereof for receiving gasified fuel therefrom valves in communication with said means for introducing said liquids and receiving said gasified fuel, a supply source of said liquids in connection with one of said valves and means establishing communication between the other of said valves and said intake manifold, means for actuating said valves simultaneously, said valve actuating means responsive in operation to inlet manifold pressure changes when said internal combustion engine is operating.

2. The generator of claim 1 wherein each of said valves comprises a hollow body member defining inlet and outlet chambers separated by an area of reduced size forming a valve seat, a rod movably disposed in said hollow body member and extending outwardly of one end thereof, a portion of said rod being hollow and a series of longitudinally spaced openings in said rod communicating with said hollow portion thereof, said openings in said rod being on both sides of said valve seat and arranged so that movement of said rod in one direction moves more of the openings into one of said chambers and movement of the rod in the opposite direction moves more of the openings into the other one of said chambers relative to said valve seat.

3. The generator of claim 1 wherein annular fins are formed on the outer surface of said tubular member in a continuous spiral configuration.

4. The generator of claim 1 and wherein said tubular member and said body member therein are straight and arranged coaxially.

5. The generator of claim 2 and wherein said valve actuating means comprise pressure responsive devices engaged on the ends of the rods extending outwardly of said valves.

6. The generator of claim 2 and wherein seals are positioned around the rods where they extend outwardly of the valves, said seals comprising areas containing flurosilicon.

* * * * *